United States Patent [19]

Furukawa et al.

[11] Patent Number: 4,578,417

[45] Date of Patent: Mar. 25, 1986

[54] STABILIZED MOISTURE CURABLE COMPOSITION

[75] Inventors: Hisao Furukawa, Kobe; Keiko Okada, Osaka; Joe Kawamura; Yasushi Kato, both of Kobe, all of Japan

[73] Assignee: Kanegafuchi Kagaku Kogyo Kabushiki Kaisha, Osaka, Japan

[21] Appl. No.: 657,101

[22] Filed: Oct. 2, 1984

[30] Foreign Application Priority Data

Oct. 3, 1983 [JP] Japan ................................. 58-185693

[51] Int. Cl.$^4$ .......................... C08K 5/06; C08L 43/04
[52] U.S. Cl. ..................... 524/378; 524/547; 524/858; 524/863; 525/326.5; 526/279; 528/20; 528/901
[58] Field of Search .................. 528/901, 20; 526/279; 524/858, 863, 378, 547; 525/326.5

[56] References Cited

U.S. PATENT DOCUMENTS

| | | | |
|---|---|---|---|
| 4,043,953 | 8/1977 | Chang | 526/279 |
| 4,157,321 | 6/1979 | Kawakami | 524/378 |
| 4,371,664 | 2/1983 | Kato | 526/279 |
| 4,477,628 | 10/1984 | Kato | 526/279 |
| 4,478,990 | 10/1984 | Kohno | 526/279 |
| 4,499,229 | 2/1985 | Lockhart | 524/863 |

FOREIGN PATENT DOCUMENTS

| | | | |
|---|---|---|---|
| 50248 | 4/1982 | European Pat. Off. | 526/279 |
| 0063753 | 11/1982 | European Pat. Off. | 526/279 |
| 58-15566 | 1/1983 | Japan | 526/279 |

OTHER PUBLICATIONS

Brewster and McEwen, *Organic Chemistry*, 3rd Ed., p. 250, Prentice Hall, N.J., 1961.

Primary Examiner—C. Warren Ivy
Attorney, Agent, or Firm—Armstrong, Nikaido, Marmelstein & Kubovcik

[57] ABSTRACT

A moisture curable composition having an improved storage stability comprising a hydrolyzable silyl group-containing vinyl polymer and an orthoacetic acid ester as a stabilizer. The storage stability of the composition containing the hydrolyzable silyl group-containing vinyl polymer, which is curable in the presence of moisture at low temperatures, can be remarkably improved by the presence of the orthoacetic acid ester.

11 Claims, No Drawings

STABILIZED MOISTURE CURABLE COMPOSITION

BACKGROUND OF THE INVENTION

The present invention relates to a moisture curable composition, and more particularly to a stablized curable composition containing a hydrolyzable silyl group-containing vinyl polymer having on the vinyl polymer chain end or the side chain thereof at least one silicon atom, to which a hydrolyzable group is linked, per one polymer molecule.

Various silyl group-containing vinyl polymers having silicon atom linked with a hydrolyzable group are known. They have a good adhesion property to inorganic materials based on the hydrolyzable silyl group and cause crosslinking at ordinary temperature by moisture, particularly moisture in the atmosphere, to form cured products having an excellent durability. Accordingly, silyl group-containing vinyl polymers have been widely used as paints, coating materials, adhesives, sealants and silane coupling agents. However, these polymers undergo hydrolysis of the terminal silyl group even in the absence of a catalyst, if moisture is present, and they gradually form siloxane linkages, thus eventually hardening. Therefore, they tend to gradually increase the viscosity during storage owing to reaction with water in the system. For such a reason, the silyl group-containing compounds are stored and used in the state that incorporation of water is prevented as much as possible. However, in case of repeatedly using the silyl group-containing compounds or in case of incorporating an additive such as a filler having a high water content into the silyl group-containing compounds, incorporation of water is unavoidable. Especially, when case that the content of the hydrolyzable silyl group is large, the storage stability becomes a problem.

The present inventors found that the silyl group-containing compounds can be formulated into a one component curing composition by adding a hydrolyzable ester compound as a stabilizer to a mixture of the silyl group-containing compound and a curing catalyst, and that a one component curing composition having an excellent storage stability can be obtained by using, from the viewpoint of dehydration, a reaction accelerator for accelerating the selective reaction between the hydrolyzable ester compound and water.

A primary object of the present invention is to provide a moisture curable composition having an improved storage stability.

A still further object of the invention is to provide a one component curing composition containing a silyl group-containing vinyl polymer and having an improved storage stability.

These and other objects of the present invention will become apparent from the description hereinafter.

SUMMARY OF THE INVENTION

It has now been found that the stablity of the moisture curable composition containing the silyl group-containing vinyl polymer is remarkably improved by using an orthoacetic acid ester of the formula: $H_3CC(OR^1)_3$ wherein $R^1$ is a monovalent hydrocarbon group such as an alkyl, aryl, halogenated alkyl or halogenated aryl group, instead of the previously proposed orthoformic acid esters. A synergistic effect on storage stability is obtained by using the orthoacetic acid ester in combination with an alkyl alcohol and/or a reaction acceleration.

In accordance with the present invention, there is provided a composition comprising (A) a silyl group-containing vinyl polymer whose main chain consists essentially of a vinyl polymer and which has on the polymer chain end or the side chain thereof at least one silicon atom to which a hydrolyzable group is linked, per one polymer molecule, and (B) an orthoacetic acid ester.

DETAILED DESCRIPTION

Polymers of which the main chain consists essentially of a polymer of a vinyl compound and which has on the polymer chain end or the side chain thereof at least one silicon atom combined with a hydrolyzable group, preferably at least two silicon atoms each combined with a hydrolyzable group, per one polymer molecule, are used in the present invention as a component (A). These polymers are known in the art. The vinyl compound includes, for instance, styrene, acrylates, methacrylates, maleic anhydride, acrylamide N-methylolacrylamide, N,N-dimethylaminoethyl methacrylate. and the like, which may be employed alone or in admixture thereof. Most of the silyl groups of the polymers (A) are represented by the following formula:

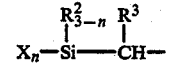

wherein X is a hydrolyzable group selected from the group consisting of a halogen, an alkoxyl group, an alkoxyalkoxyl group, an acyloxyl group, a ketoxymate group, amino group, an acid amide group, aminoxy group, mercapto group and an alkenyloxy group, $R^2$ and $R^3$ are hydrogen or a hydrocarbon group having 1 to 10 carbon atoms selected from the group consisting of an alkyl group, an aryl group and an aralkyl group, and n is an integer of 1 to 3.

The silyl group-containing vinyl polymers (A) used in the present invention can be prepared by various processes. For instance, a process by hydrosilylation of a vinyl polymer having a carbon-carbon double bond with hydrosilane and a process by copolymerization of a vinyl compound and a silyl compound having a polymerizable double bond are industrially advantageous.

The silyl group-containing vinyl polymers used in the invention are desired to have a number average molecular weight within the range of 1,000 to 30,000, though the molecular weight thereof is not particularly limited thereto.

The silyl group-containing vinyl polymers containing units of an ethylenically unsaturated compound as a comonomer which have an active hydrogen, e.g. carboxyl group, hydroxyl group, amino group and acid amide group, show a further improved adhesion property to substrates. The content of such a comonomer is usually from 0.1 to 10% by weight.

Orthoacetic acid esters of the formula:

wherein $R^1$ is a monovalent hydrocarbon group, especially a hydrocarbon group having 1 to 16 carbon atoms, e.g. an alkyl group, an aryl group, a halogenated alkyl group, a halogenated aryl group or an alkoxyalkyl group, are employed in the present invention. Examples of the orthoacetic acid esters are, for instance, methyl orthoacetate, ethyl orthoacetate, butyl orthoacetate, 2-methoxyethyl orthoacetate, and the like. Preferably, the amount of the orthoacetic acid ester is from 0.5 to 25 parts by weight per 100 parts by weight of the silyl group-containing vinyl polymer.

The orthoacetic acid esters may be employed in combination with other stabilizers such as methyl silicate, ethyl silicate, methyltrimethoxysilane, methyltriethyoxysilane, phenyltrimethoxysilane, phenyltriethoxysilane, vinyltrimethoxysilane, vinyltriethoxysilane, γ-methacryloyloxypropyltrimethoxysilane, γ-methacryloyloxypropyltriethoxysilane, γ-mercaptopropyltrimethoxysilane and the like.

Compounds known as curing catalysts for usual hydrolyzable silyl group-containing compounds can be used in the present invention as a curing catalyst. Examples of the curing catalyst are, for instance, alkyltitanates; acidic compounds such as phosphoric acid, dibutyl acid phosphate, dioctyl acid phosphate, p-toluenesulfonic acid and phthalic acid; amine compounds, e.g. aliphatic diamines such as ethylenediamine and hexamethylenediamine, aliphatic polyamines such as diethylenetriamine, triethylenetetramine and tetraethylenepentamine, alicyclic amines such as piperidine and piperazine, aromatic amines such as m-phenylenediamine, ethanolamines, triethylamine, and various modified amine compounds used as hardeners for epoxy resin; organotin compounds, e.g. organotin carboxylate compounds such as compounds of the following formulas:

(n—C$_4$H$_9$)$_2$Sn(OCO—n—C$_{11}$H$_{23}$)$_2$ (n—C$_4$H$_9$)$_2$Sn(OCOCH=CHCOOCH$_3$)$_2$ (n—C$_4$H$_9$)$_2$Sn(OCOCH=CHCOO—n—C$_4$H$_9$)$_2$ (n—C$_8$H$_{17}$)$_2$Sn(OCO—n—C$_{11}$H$_{23}$)$_2$ (n—C$_8$H$_{17}$)$_2$Sn(OCOCH=CHCOOCH$_3$)$_2$ (n—C$_8$H$_{17}$)$_2$Sn(OCOCH=CHCOO—n—C$_4$H$_9$)$_2$ (n—C$_8$H$_{17}$)$_2$Sn(OCOCH=CHCOO—iso—C$_8$H$_{17}$)$_2$ Sn(OCO—n—C$_8$H$_{17}$)$_2$ organotin mercaptide compounds such as compounds of the following formulas:

(n—C$_4$H$_9$)$_2$Sn(SCH$_2$COO)

(n—C$_4$H$_9$)$_2$Sn(SCH$_2$COO—iso—C$_8$H$_{17}$)$_2$ (n—C$_8$H$_{17}$)$_2$Sn(SCH$_2$COO)

(n—C$_8$H$_{17}$)$_2$Sn(SCH$_2$CH$_2$COO)$_2$ (n—C$_8$H$_{17}$)$_2$Sn(SCH$_2$COOCH$_2$CH$_2$OCOH$_2$S)$_2$ (n—C$_8$H$_{17}$)$_2$Sn(SCH$_2$COOCH$_2$CH$_2$CH$_2$OCOH$_2$S)

(n—C$_8$H$_{17}$)$_2$Sn(SCH$_2$COO—iso—C$_8$H$_{17}$)$_2$ (n—C$_8$H$_{17}$)$_2$Sn(SCH$_2$COO—n—C$_{12}$H$_{25}$)$_2$

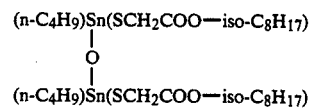

organotin sulfide compounds such as compounds of the following formulas:

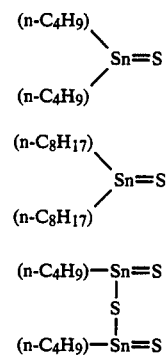

organotin oxides such as (n—C$_4$H$_9$)$_2$SnO and (n—C$_8$H$_{17}$)$_2$SnO, and reaction products of the organotin oxides and ester compounds such as ethyl silicate, Ethyl Silicate 40 (commercial name of partially hydrolyzed ethyl silicate made by Nippon Unicar Co., Ltd.), diemethyl maleate, diethyl maleate, dioctyl maleate, dimethyl phthalate, diethyl phthalate and dioctyl phthalate; and the like. The curing catalyst is employed in an amount of 0.5 to 5 parts by weight per 100 parts by weight of the silyl group-containing vinyl polymer.

A solvent may be employed in the present invention. Any solvents which can dissolve both the silyl group-containing vinyl polymer and the curing catalyst or which do not produce precipitate when admixed therewith, even if they cannot dissolve them, are usable. For instance, solvents used in general paints, coating compositions and so on can be used in the present invention, and include, for instance, aliphatic hydrocarbons, aromatic hydrocarbons, halogenated hydrocarbons, alcohols, ketones, esters, ethers, alcohol esters, ketone alcohols, ether alcohols, ketbne ethers, ketone esters and ester ethers. The amount of the solvent varies depending on the molecular weight of the silyl group-containing vinyl polymer and the proportions of the used components, and is determined according to the concentration of solids matter or viscosity of the composition required in practical use. Usually, the amount of the solvent is selected from 75 to 500 parts by weight per 100 parts by weight of the silyl groupcontaining vinyl polymer.

The use of a reaction accelerator is effective in accelerating the selective reaction between the orthoacetic acid ester and water, whereby removal, of water in the system is accelerated and the stability is raised. Examples of the reaction accelerator are, for instance, hydrochloric acid, sulfuric acid, formic acid, acetic acid, and the like. The amount of the reaction accelerator is from 0.001 to 0.1 part by weight per 100 parts by weight of the silyl group-containing vinyl polymer.

The stability of the composition of the invention can be further improved by the addition of an alcohol compound. The alcohol compound includes an alkyl alcohol and an ethylene glycol alkyl ether having a C$_1$ to C$_{10}$ alkyl group such as ethyl or butyl cellosolve. Preferable alkyl alcohols are those having a $C_1$ to $C_{10}$ alkyl group, such as methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol and octyl alcohol. The amount of the alcohol is at most 50 parts by weight per 100 parts by weight of the vinyl polymer.

The composition of the present invention may be formed into either a two component type that the silyl group-containing vinyl polymer is admixed just before use with the curing catalyst, if necessary, further with the solvent, or a one component type that all ingredients are admixed, packed in a container and used as it is.

Usual other additives may be incorporated in the composition of the invention, e.g. fillers, pigments, ultraviolet absorbents, antioxidants, flatting agents and levelling agents in known effective concentrations.

The composition of the present invention is curable at ordinary temperature or low temperatures, and provides a cured product having excellent properties, e.g. adhesion property and weathering resistance. Therefore, the composition of the invention is useful for the various purposes, e.g. paints, coating materials, primers and adhesives for the surfaces of inorganic materials such as iron and steel plates, tinplate sheets, galvanized iron sheets, aluminum plate, zinc plate, tiles and slates, and organic materials such as wood, paper, cellophane, plastics and coatings of organic paints. The composition is particularly suitable as an anticorrosive finishing paint for a bridge, a top coat, an automotive refinishing paint and a paint for the surfaces of organic materials, because of being curable at a low temperature.

It is possible to blend the composition of the invention with various resins used in paints, coating materials, primers and adhesives. Therefore, the composition of the invention can be admixed in suitable proportions, for instance, with lacquer, acrylic lacquer, thermosetting acrylic paint, alkyd paint, melamine paint or epoxy paint, whereby the physical properties such as adhesion property and weathering resistance of these paints or coatings can be improved.

The present invention is more specifically described and explained by means of the following Examples in which all parts and % are by weight unless otherwise noted. It is to be understood that the present invention is not limited to the Examples, and various changes and modifications may be made in the invention without departing from the spirit and scope thereof.

The following Reference Examples are also presented to illustrate the preparation of the silyl group-containing vinyl polymer.

REFERENCE EXAMPLE 1

To 50 g. of xylene heated at 90° C. was added dropwise a solution of 1 g. of azobisisobutyronitrile dissolved in a mixture of 5 g. of styrene, 15 g. of butyl acrylate, 68 g. of methyl methacrylate, 23 g. of γ-methacryloyloxypropyltrimethoxysilane and 1 g. of acrylamide. The reaction was carried out for 8 hours to give a silyl group-containing vinyl polymer having a molecular weight of 15,000.

REFERENCE EXAMPLE 2

To 35 g. of xylene heated at 90° C. was added dropwise a solution of 5 g. of azobisisobutyronitrile dissolved in a mixture of 15 g. of styrene, 20 g. of butyl acrylate, 55 g. of methyl methacrylate, 19 g. of γ-methacryloyloxypropyltrimethoxysilane and 1 g. of acrylamide. The reaction was carried out for 8 hours to give a silyl group-containing vinyl polymer having a molecular weight of 5,500.

EXAMPLES 1 TO 4 AND COMPARATIVE EXAMPLE 1

To the copolymer solution obtained in Reference Example 1 were added the ingredients shown in Table 1. and the concentration of solid matters was adjusted to 55% with xylene. To the obtained composition was added 500 p.p.m. of water, and the composition was allowed to stand at 50° C. for 1 month in a sealed state to make a storage test.

The viscosity of the compositon was measured at 25° C. before and after the storage by a Brookfield viscometer.

The above procedure was repeated except that the copolymer solution was diluted with xylene without adding the additives.

The results are shown in Table 1.

TABLE 1

| | Vinyl polymer | Orthoacetic acid ester (5 parts) | Dehydration accelerator (0.003 part) | Alcohol (10 parts) | Viscosity (cP) Original | After 1 month at 50° C. |
|---|---|---|---|---|---|---|
| Ex. 1 | Ref. Ex. 1 | methyl orthoacetate | — | — | 4680 | 5250 |
| Ex. 2 | Ref. Ex. 1 | methyl orthoacetate | conc. HCl | — | 4680 | 4970 |
| Ex. 3 | Ref. Ex. 1 | methyl orthoacetate | conc. HCl | methanol | 4010 | 4210 |
| Ex. 4 | Ref. Ex. 1 | ethyl orthoacetate | — | — | 4680 | 4290 |
| Com. Ex. 1 | Ref. Ex. 1 | — | — | — | 4680 | 5600 |

(Note)
Parts in the Table are parts by weight per 100 parts by weight of the vinyl polymer.

EXAMPLES 5 AND 6 AND COMPARATIVE EXAMPLE 2

A one component curing composition having a solid concentration of 40% was prepared from the copolymer solution obtained in Reference Example 2 according to the formulation shown in Table 2 by mixing the silyl group-containing vinyl polymer, stabilizer, xylene and dehydration accelerator, allowing the mixture to stand at room temperature for 2 hours and then adding the curing catalyst to the mixture. To the composition was added 500 p.p.m. of water, and the composition was placed in a container and allowed to stand at 50° C. for 1 month in a sealed state. The viscosity of the composition was measured at 25° C. by using a Ford Cup #4.

The results are shown in Table 2.

TABLE 2

| | Vinyl polymer | Stabilizer | Dehydration accelerator (0.003 part) | Curing catalyst (1.5 parts) | Viscosity (second) | |
|---|---|---|---|---|---|---|
| | | | | | Original | After 1 month at 50° C. |
| Ex. 5 | Ref. Ex. 2 | methyl orthoacetate (3 parts) ethyl silicate (3 parts) | conc. HCl | OAP | 13.6 | 13.9 |
| Ex. 6 | Ref. Ex. 2 | methyl orthoacetate (3 parts) | conc. HCl | OAP | 13.2 | 13.2 |
| Com. Ex. 2 | Ref. Ex. 2 | methyl orthoformate (3 parts) ethyl silicate (3 parts) | conc. HCl | OAP | 13.6 | 18.2 |

(Notes)
Parts are parts by weight per 100 parts by weight of the vinyl polymer.
OAP shows dioctyl acid phosphate.

It is found from the Tables that the storage stability is remarkably improved by the addition of orthoacetic acid esters.

Also, it was observed that there was no difference in the physical properties of the films formed from the compositions of the invention containing the orthoacetic acid ester between before and after the storage.

In addition to the ingredients used in the Examples, other ingredients can be used in the Examples as set forth in the specification to obtain substantially the same results.

What we claim is:

1. A composition comprising (A) a silyl group-containing vinyl polymer whose main chain consists essentially of a vinyl polymer and which has on the polymer chain end or a side chain thereof at least one silicon atom to which a hydrolyzable group is linked per one polymer molecule, and (B) 0.5 to 25 parts by weight per 100 parts by weight of (A) of an orthoacetic acid ester of the formula:

$$H_3CC(OR^1)_3$$

wherein $R^1$ is a monovalent hydrocarbon group having 1 to 16 carbon atoms.

2. The composition of claim 1, wherein said orthoacetic acid ester is methyl orthoacetate.

3. The composition of claim 1, wherein said silyl group-containing vinyl polymer (A) has a number average molecular weight of 1,000 to 30,000.

4. The composition of claim 1, which further contains an alkyl alcohol.

5. The composition of claim 4, wherein said alkyl alcohol is a $C_1$ to $C_{10}$ alkyl alcohol.

6. The composition of claim 4, wherein said alkyl alcohol is present in an amount of 0 to 50 parts by weight per 100 parts by weight of the silyl group-containing vinyl polymer (A).

7. A composition comprising (A) a silyl group-containing vinyl polymer whose main chain consists essentially of a vinyl polymer and which has on the polymer chain end or a side chain thereof at least one silicon atom to which a hydrolyzable group is linked per one polymer molecule,
(B) an orthoacetic acid ester of the formula;

$$H_3CC(OR^1)_3$$

wherein $R^1$ is a monovalent hydrocarbon group having 1 to 16 carbon atoms,
(C) a catalyst for curing said silyl group-containing vinyl polymer (A), and
(D) A solvent for the silyl group-containing vinyl polymer (A) and the catalyst (C).

8. The composition of claim 7, wherein the orthoacetic acid ester (B), curing catalyst (C) and solvent (D) are present in amounts of 0.5 to 25 parts by weight, 0.5 to 5 parts by weight and 75 to 500 parts by weight, respectively, per 100 parts by weight of the silyl group-containing vinyl polymer (A).

9. The composition of claim 7, wherein said orthoacetic acid ester is methyl orthoacetate.

10. The composition of claim 7, wherein said silyl group-containing vinyl polymer (A) has a number average molecular weight of 1,000 to 30,000.

11. The composition of claim 7, wherein said solvent contains an alkyl alcohol.

* * * * *